United States Patent [19]
Juhrend

[11] 3,951,254
[45] Apr. 20, 1976

[54] STACK ACCUMULATOR

[75] Inventor: Eugene F. Juhrend, Birmingham, Mich.

[73] Assignee: Mojonnier Bros. Co., Chicago, Ill.

[22] Filed: Oct. 16, 1974

[21] Appl. No.: 515,292

[52] U.S. Cl. .................................. 198/37; 198/34; 214/83.36
[51] Int. Cl.² ........................................ B65G 43/08
[58] Field of Search ............ 198/37, 34, 168, 127 R, 198/160, 219; 193/35.5 S; 214/83.36

[56] References Cited
UNITED STATES PATENTS

| | | | |
|---|---|---|---|
| 3,042,185 | 7/1962 | Welch | 198/160 |
| 3,193,081 | 7/1965 | Harrison et al. | 198/37 |
| 3,620,353 | 11/1971 | Foster et al. | 198/160 |
| 3,690,435 | 9/1972 | King et al. | 198/168 UX |

Primary Examiner—Evon C. Blunk
Assistant Examiner—Douglas D. Watts
Attorney, Agent, or Firm—Olson, Trexler, Wolters, Bushnell & Fosse

[57] ABSTRACT

There is disclosed conveyor apparatus which provides for the interruption and subsequent re-establishment of driving engagement between the conveyor drive means and the conveyed articles. The conveyor employs a stationary frame having support surfaces adapted to have the conveyed articles supported thereon. In conjunction with the frame, there is disclosed drive means support structure which is movable relative to said frame. Accordingly, the drive means may be positioned above the frame support surfaces to provide driving engagement, or said drive means may be lowered to level which results in the conveyed articles resting upon the frame, with an interruption in said driving engagement. The preferred form of mounting means disclosed for said drive means support structure, includes a pressurized element, such that the relative movement of said support structure may be achieved in response to the weight of conveyed articles resting upon said support structure.

19 Claims, 9 Drawing Figures

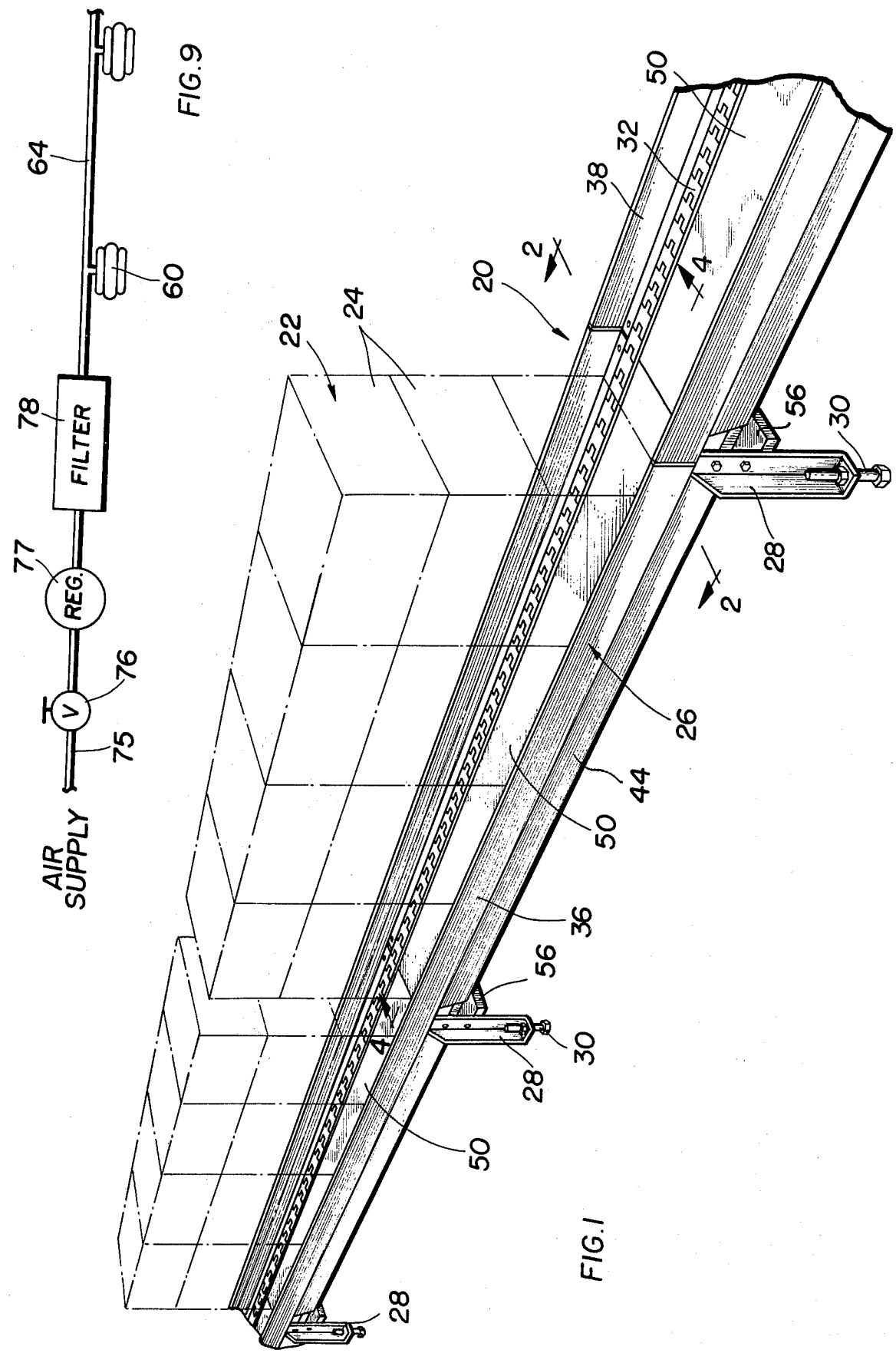

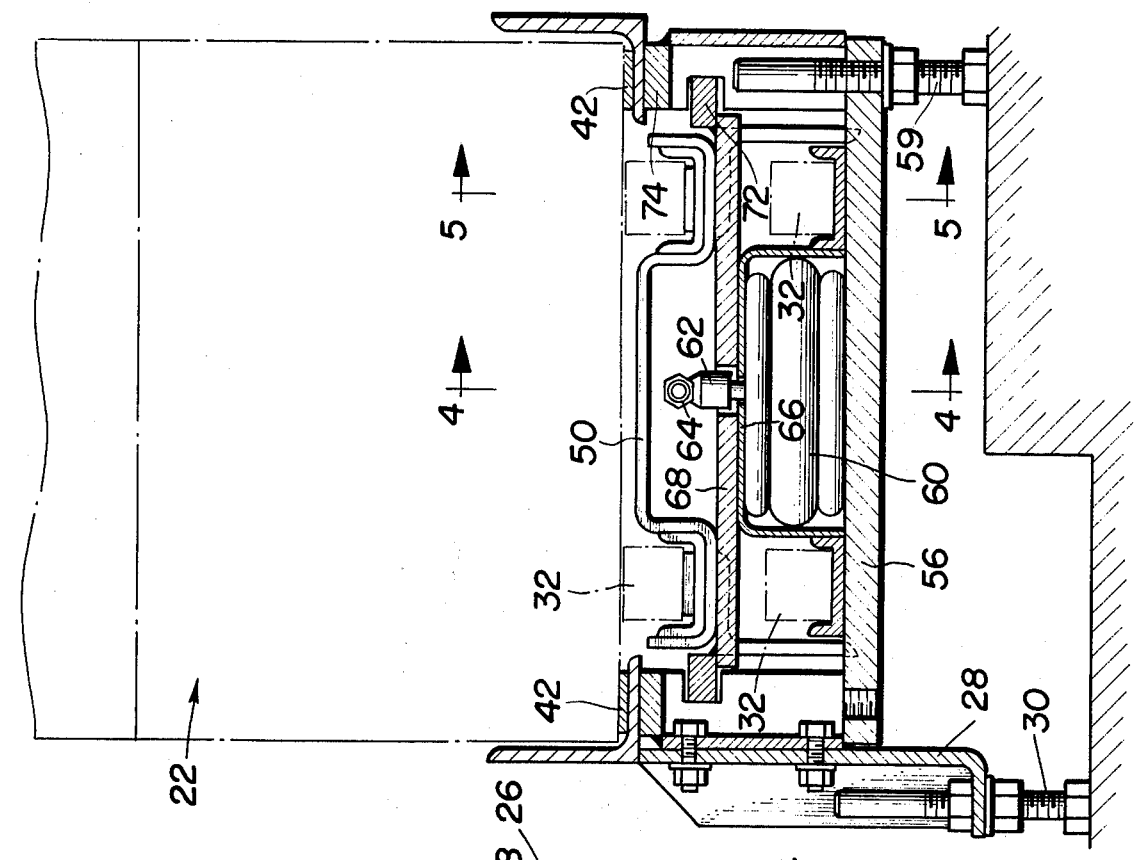
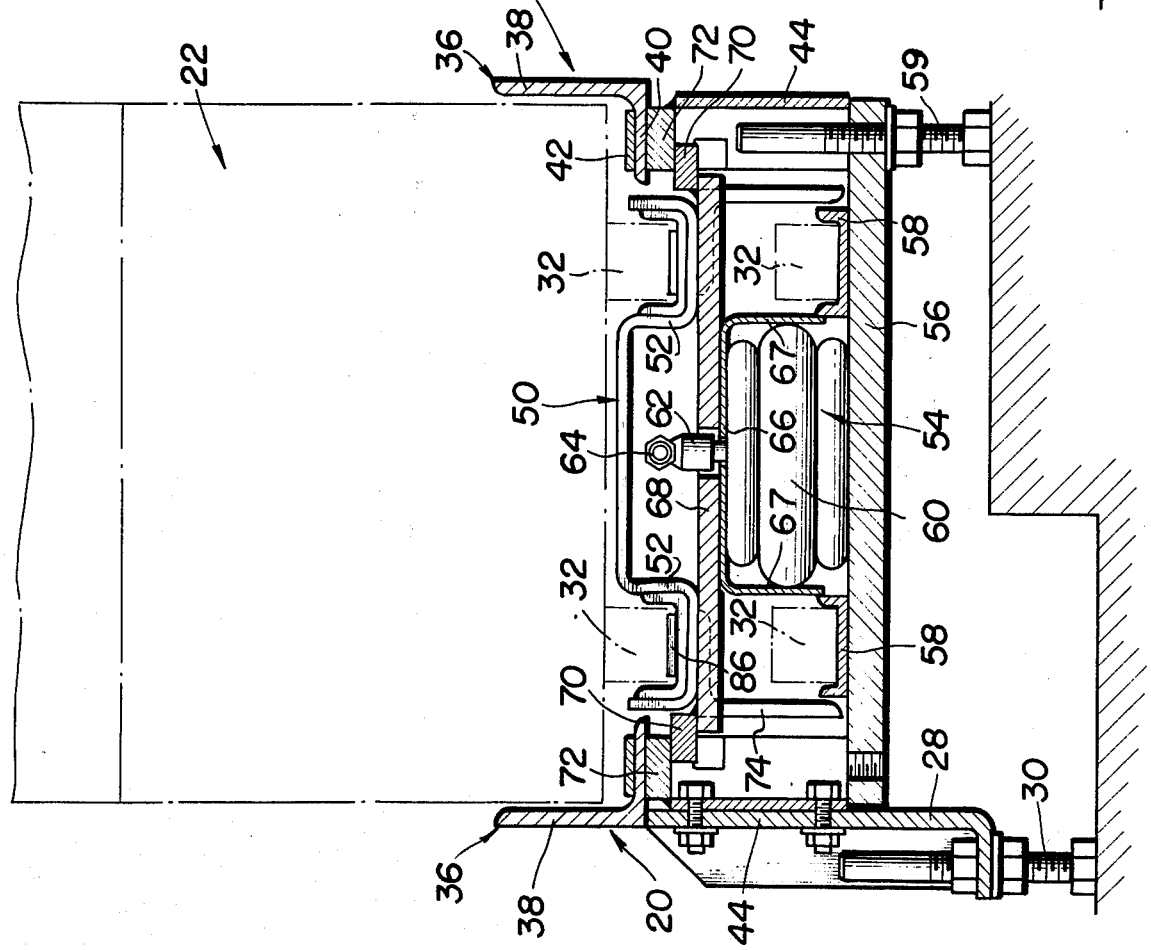

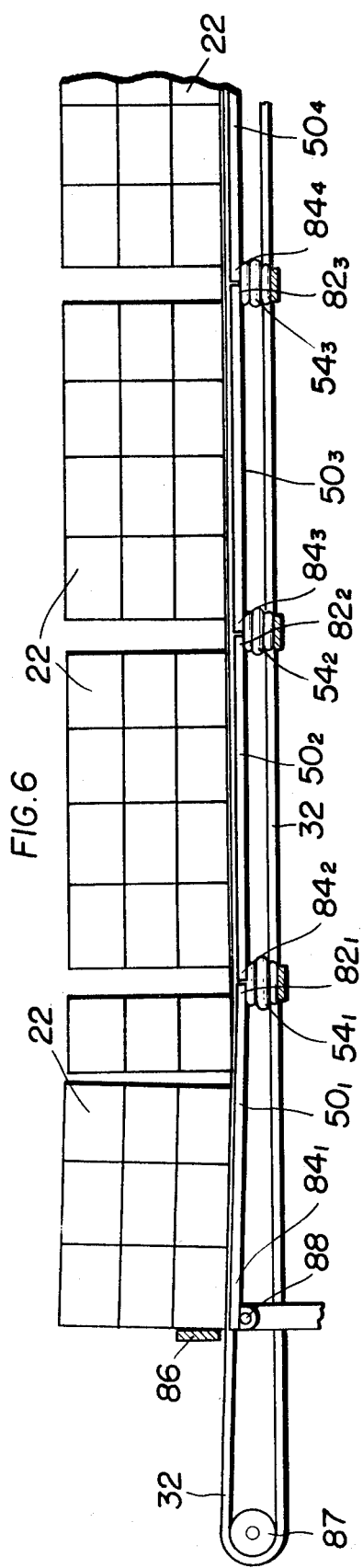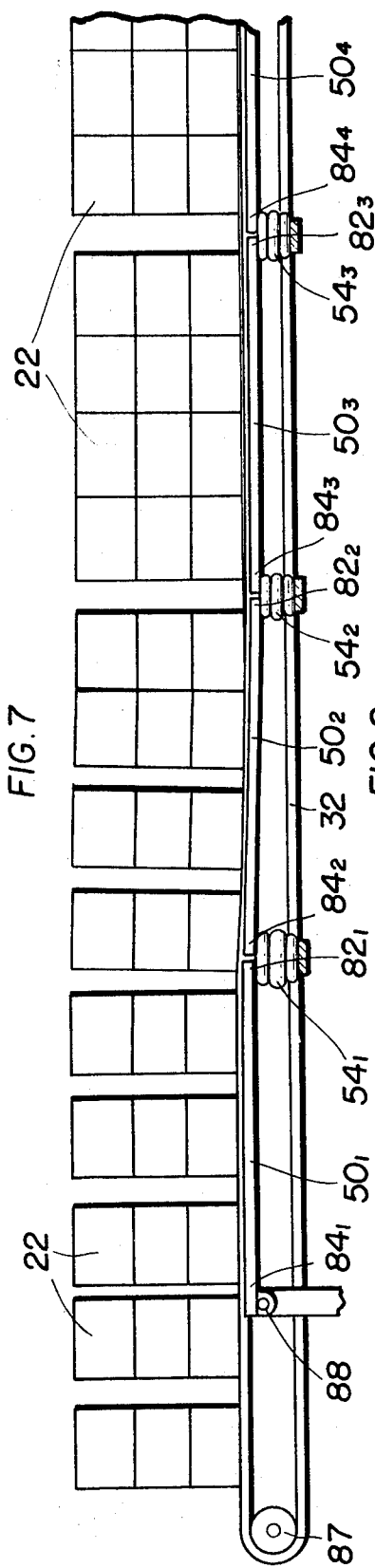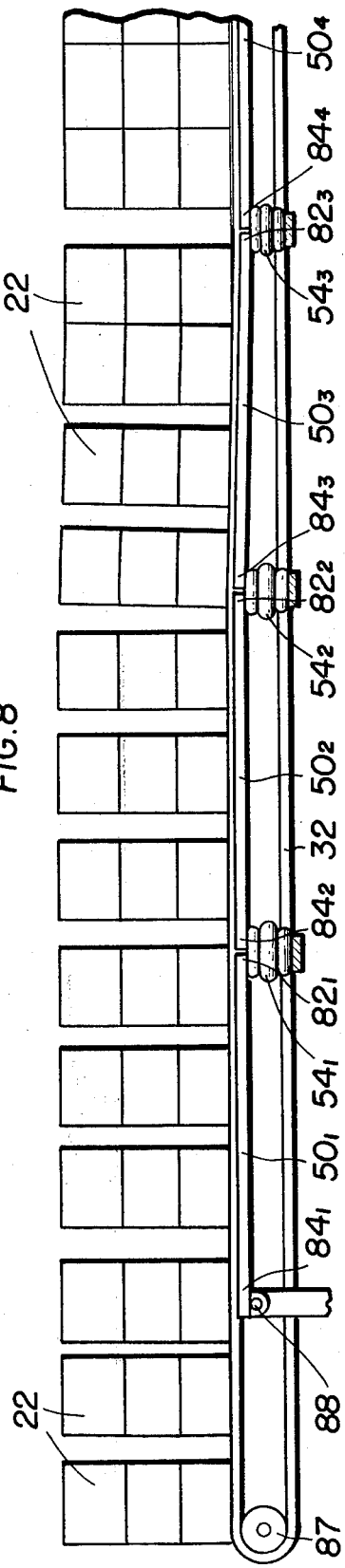

STACK ACCUMULATOR

BACKGROUND OF THE INVENTION

The present invention relates to conveyor apparatus, and more specifically to conveyor apparatus designed to provide for control in the application of driving forces to the conveyed articles, in response to overload conditions, with the drive means for the conveyor being maintained in an energized state.

While it is known in the conveyor art to employ apparatus capable of responding to overload conditions to provide for the interruption of the conveying process, the interruption of the conveying process is normally achieved by the disabling or de-energizing of the drive apparatus. The control apparatus necessary to achieve the de-energizing of the drive apparatus is normally quite sophisticated, and therefore relatively expensive. In addition, while the prior art type of conveyor apparatus may be satisfactory when relatively light articles are being conveyed, or short distances are involved, these are not satisfactory for use with the conveying of extremely heavy articles that must travel long distances.

One practical area wherein the problems as mentioned above are prevalent, is with regard to dairy processing plants, as will be explained more completely hereinafter. While the present invention will be described with reference to its application to the conveying problem encountered in dairy processing plants, this is being done for purposes of illustration and not by way of limitation.

Concerning specifically the dairy industry, processing plants will often employ a plurality of rather lengthy conveyor lines which feed a single palletizing station, wherein cases of the bottled dairy products are stacked on pallets for loading aboard trucks. With present day practices, the dairy product is packaged in either bottles or cardboard containers, and then disposed within rather sturdy cases which afford protection during transportation. These cases, which may contain six or more bottles or containers, are then moved to a stacking station, wherein they are stacked three to six cases high and are positioned on conveyor apparatus for movement to the palletizing station. In this regard, normally three or more filling stations will feed to a single palletizing station.

At the palletizing station, the stacks of filled cases are received and positioned on pallets for loading into trucks. The conveyor apparatus leading into the palletizing station will supply stacks of cases thereto in single file with three or more stacks being received at a time and being moved laterally onto the pallets. Once the first group of stacked cases is on the pallet, a second group is moved onto the palletizing apparatus and is moved laterally onto the pallets adjacent the first group. This operation is repeated until the pallet is filled.

As can be appreciated from the above discussion, the palletizing operation requires the intermittent supply of stacked cases, with only a relative short duration between the interruption of supply. However, for efficient operation, it can also be seen that an adequate supply of stacks of cases must be provided. To achieve this, the conveyor apparatus leading to the palletizing station will generally be loaded with stacked cases for a substantial distance along the length thereof.

To achieve the intermittent supply of stacked cases, various types of control apparatus are employed, which include some form of stop member which engages the forwardmost case on the conveyor to retard movement. This stop member is removed from the path of the conveyor, permitting the prescribed number of cases to move onto the palletizing apparatus, and is then repositioned to preclude further movement of the stacked cases past the outlet end of the conveyor. With this approach there exists a number of problems, as discussed immediately hereinafter.

Because of the short duration in the interruption of supply to the palletizing station; and in view of the extremely heavy weight of the stacks of cases, it is not practical to rely upon interruption of the supply of power to the drive means to effect the desired control of the supplying operation. Therefore with the conveyor apparatus presently in use, the drive means is operated continuously. Accordingly, when the stop is inserted in the conveyor path, the drive means, normally in the form of a pair of endless chains, will merely slip with regard to the underside of the lowermost cases in the various stacks.

In addition the above-mentioned interruption in the conveying process results in a chain reaction, in that the forwardmost stack will be brought to rest by engagement against the stop, with the remaining stacks being brought to rest by engagement with the stack immediately in front. As can be appreciated, the engagement of these rather heavy stacks produces a shock load which is applied to the individual cases, as well as to the stop member.

The prior art type of conveyor apparatus thus has a number of inherent disadvantages. First, the slippage of the chains past the cases produces wear both on the cases and on the upper surface of the chain. Secondly, the cases, the containers for the dairy products and the overall conveyor apparatus, including the stop means, are subjected to rather high shock loads which ultimately result in damage and wear thereto.

Subsequent to introduction of the present invention, the above-discussed problems were merely tolerated in that the cases and conveyor machinery were constructed of sufficient strength to withstand the adverse operating conditions. The present invention solves these problems inherent in the prior art in a unique manner by providing for the interruption of and the resumption in the application of driving forces to the conveyed articles, without de-energizing the driving apparatus. As will be apparent, this is achieved while minimizing the shock loads encountered, as well as the wear due to drive chain slippage.

More specifically, the present invention provides a conveyor arrangement which includes an elongate stationary frame having support surface means therealong adapted to support a stack of filled cases. A support arrangement for the drive means is provided in association with the frame, which includes mounting means providing for movement of the drive means support and the drive means relative to the stationary frame and the support surface means thereon. The aforementioned mounting means is designed to be responsive to the weight of the conveyed articles on individual sections of the conveyor apparatus, such that when the weight of conveyed articles on a particular section exceeds a predetermined amount, the drive means will be positioned at a level which permits the stacked cases to rest on the frame support surface, thereby effecting an interruption in driving engagement. When the weight of stacked cases on a particular section is less than a predetermined amount, the drive means supporting arrangement will move the drive means upwardly above the frame support surfaces to bring the drive means into driving engagement with the stack of cases and thereby resume the conveying operation. The present invention, as will be explained more completely hereinafter, is designed to achieve re-establishment of driving engagement in a progressive manner so that the stacks will move along the conveyor in spaced relation. In addition, the gradual re-establishment of driving engagement minimizes the shock load to the drive means and associated apparatus.

DESCRIPTION OF THE DRAWINGS

FIG. 1 is a partial perspective view of an intermediate section of conveyor apparatus constructed in accordance with the present invention, having the stacked cases to be conveyed illustrated in phantom;

FIG. 2 is a sectional view taken all along the line 2—2 of FIG. 1, with the drive chain and the stacked cases illustrated in phantom, and the apparatus in the conveying condition;

FIG. 3 is a sectional view similar to FIG. 2 illustrating the condition of the conveyor apparatus during interruption of the conveying process;

FIGS. 6, 7 and 8 are schematic representations of the conveyor apparatus of the present invention including the discharge end thereof, and illustrating, respectively, the conditions existing upon interruption of the conveying process; the conditions immediately upon resumption; and the conditions existing during re-establishment of the conveying process and just prior to a subsequent interruption thereof;

FIG. 9 is a schamatic representation of one form of control apparatus employed with regard to the pressure actuated mounting arrangement for the drive chains support structure.

DESCRIPTION OF THE ILLUSTRATED EMBODIMENT

Figure 4:
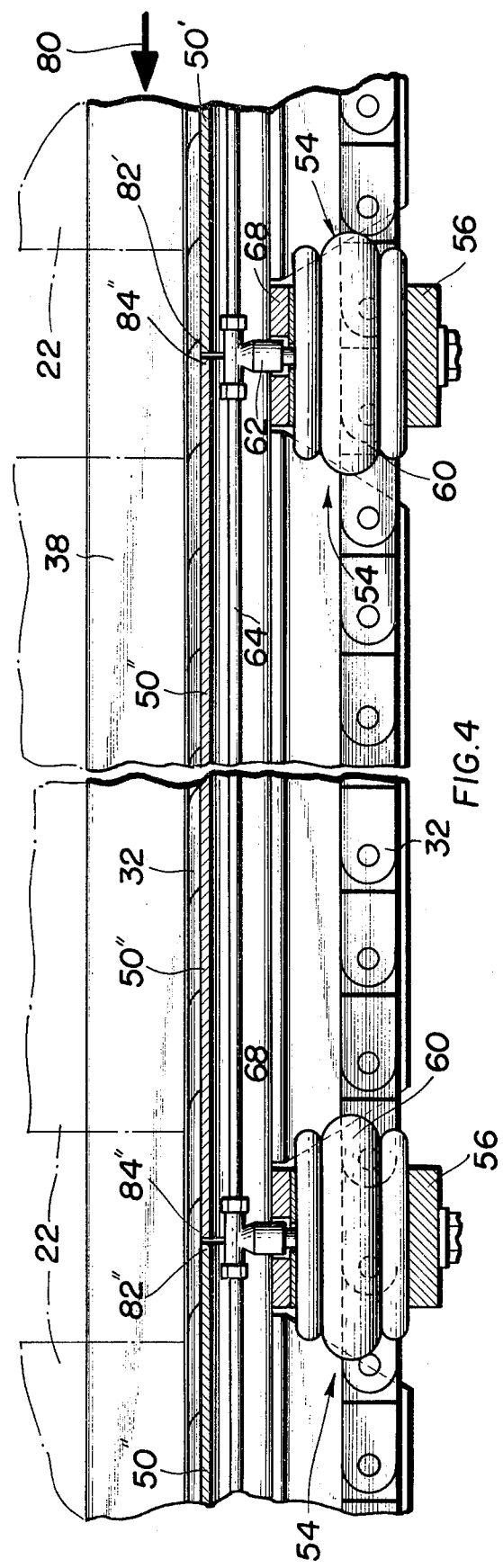
FIG. 4 is a sectional view taken along the line 4—4 of FIG. 3.

With regard to the illustrated embodiment, an intermediate section of the conveyor is illustrated generally in FIGs. 1 – 5, which conveyor is designated by the reference character 20. In FIGS. 6 – 8, there is shown a somewhat schematic layout of the conveyor arrangement at the discharge point, that is wherein the stacks 22 of cases 24 leave the conveyor 20. In this regard, FIGS. 6 – 8 are sequential representations which, as will be discussed hereinafter, illustrate the manner in which the driving engagement with the stacks 22 is re-established, once it has been interrupted. Accordingly, it is believed that before the present invention can be fully appreciated, it is necessary to consider the general structure of the conveyor 20, and the manner in which driving engagement with the stacks 22 is initially interrupted in response to overload conditions.

Directing attention now to FIG. 1, the conveyor 20 is shown with a number of stacks of cases 22 positioned thereon, said stacks 22 being illustrated in phantom outline. The conveyor 20 includes an elongate frame 26 supported above the floor by a plurality of legs 28 spaced along the length thereof. The individual legs 28 may include adjustment screws 30 to assist in leveling the conveyor upon installation, or from time to time as needed. Disposed interiorly of the frame 26 is one or more endless drive chains 32, with two such chains 32 being preferred and shown in the illustrated embodiment. During the conveying process the stacks 22 will rest upon drive chains 32, and will move therewith in response to said chains being driven by motor means (not shown).

As was mentioned previously, the drive chains 32 are in effect mounted for vertical movement relative to the frame 26. To better understand the structure which provides for said movement, attention is directed to FIGS. 2 and 3 which are transverse sectional views taken at a selected location along the length of the conveyor 20. As will be explained more fully hereinafter, the conveyor 20 includes means for supporting the drive chains 32 which means is segmented, and there being provided mounting structures at the junctions of the respective segments. As such, FIG. 2 is taken at one of said junctions. It should also be noted that FIG. 2 illustrates the conditions existing when driving engagement is established between the drive chains 32 and the stacks 22 of cases, with said stacks resting upon the drive chains. FIG. 3, on the other hand, illustrates the conditions existing upon interruption of the driving engagement between the drive chains 32 and the stacks 22. More importantly, these figures also illustrate the supporting structure for the individual drive chains 32.

Looking first to FIG. 2, it should be noted that the frame 20 is assembled from a plurality of elements, in addition to the aforementioned legs 28 and leveling screws 30. Briefly, frame 20 includes a pair of spaced L-shaped elements 36, one side 38 thereof providing, in effect, guide rails, while the horizontally disposed sections 40 of said elements provide a pair of generally co-planar, horizontal surfaces upon which wear strips 42 are mounted. As can be seen in FIG. 3, the wear strips 42 are spaced so as to provide supporting surfaces upon which the stacks 22 can rest upon interruption of the aforementioned driving engagement. The weldments which make up the frame 20 also includes parallel side panels 44 to which the legs 28 may be attached.

Disposed intermediate the L-shaped elements 36, are a plurality of elongate, drive chain supporting sections 50, which includes a pair of parallel-spaced troughs 52 in which the drive chains 32 are engaged. As will be noted from FIG. 1, the respective support sections 50 extend generally along the length of the conveyor and are in aligned adjacent relationship. It further should be kept in mind, that FIGS. 2 and 3 are taken at the point of intersection or juncture of a pair of adjacent sections 50 which, as will be explained more completely hereinafter, are jointly movable relative to the frame 26.

To achieve mounting of the various drive chain supporting sections 50, there is provided at the juncture of each pair a mounting unit, designated generally 54. The unit 54 rests upon a stationary support plate 56 which is welded or otherwise attached to the frame 26 and is employed only in the area of the juncture of the support sections 50, as can be seen from FIG. 4. The support plate 56 serves a dual function in that not only does it provide a base for mounting unit 54, but also provides a support surface for guides 58 which accommodate the return or lower reach of the endless drive chains 32. If desired, additional leveling or support screws 59 may be employed in conjunction with the support plate 56.

Directing specific attention now to FIG. 2, it should be noted that the mounting unit 54 is comprised primarily of an expandable air bag 60 supplied with pressurized air via a fitting 62 and a supply pipe 64, best viewed in FIg. 4. The air bag 60 is positioned within an open-ended, inverted U-shaped channel section 66 upon which is mounted a plate element 68. The section 66 also serves to protect the air bag against punctures. The ends of the adjacent drive chain support section 50 are both mounted upon the plate element 68 for joint movement therewith. At the ends of the plate element 68 are a pair of stop blocks 70 which engage abutment elements 72 affixed to the aforementioned L-shaped channels 36. Accordingly, when the air bag 60 is pressurized, it will inflate and expand, elevating the plate 68 until a stop block 70 engages the abutment 72. This movement will correspondingly elevate the ends of the drive chain supporting sections 50, as they have mounted upon plate 68. This in turn positions the drive chains 32 above the level of the wear strips 42. As such, the stacks 22 of cases being conveyed will ride upon the drive chains 32 and will move along the length of the conveyor with said chains 32, which as mentioned above are driven by a conventional motor and gearing arrangement (not shown).

To insure the proper movement of the support unit 54, relative to the stationary elements of frame 26, and most particularly the support plate 56, guide means are provided. In this regard, the vertical parallel sections 67 of the U-shaped element 66 fit between the return guides 58 to preclude undesired lateral movement. In addition, as will be noted with regard to FIG. 3 the sections 67 also serve as a limit stop due to abutment with the base plate 56 upon depression of the drive chain support sections 50. The plate member 68 is provided with a number of vertically disposed projections 74 positioned on opposite sides of the base plate 56 thereby to limit longitudinal movement.

Looking now to FIG. 3, there is illustrated the condition of the elements of the conveyor 20 when driving engagement of the drive chains 32 with the stacks 22 is interrupted. In this regard, it will be recalled that the air bags 60 are pressurized and expanded to achieve the desired driving engagement with the stacks 22. Since the support sections 50 are maintained in position only by means of the upwardly directed forces provided by air bags 60, when the weight of the stacks 22 on any adjacent chain supporting sections 50 is sufficient to overcome said upwardly directed forces established by the air bags 60, the bags 60 will be depressed, resulting in a lowering of the drive chain supporting sections 50, and correspondingly the segments of drive chains 32 mounted thereon.

With the illustrated embodiment of the present invention, means are provided for controlling the pressure to the air bags 60, which control means is illustrated schematically in FIG. 9. The control means for air bags 60 is generally of a conventional design and includes a supply line 75 running from a source of compressed air (not shown); an on-off valve 76, a pressure regulator 77 and if desired a filter 78. By setting the regulator 77, the pressure of the air supplied to air bags 60 may be regulated to achieve the operating features discussed herein.

Since the length of respective chain support sections 50 is controlled, only a specific number of stacks 22 can be accommodated thereon at any give time, the approximate weight of which is known or can be easily determined. Therefore, by controlling the pressure applied to the air bags 60, which determines the uplifting force applied to the chain support sections 50, said uplifting force can be adjusted such that should the support sections 50 become filled with stacks 22, which represents an overload condition, the air bags 60 will be depressed and the chain support sections 50 will be lowered. As this occurs, the stacks 22 come to rest upon the wear strips 42 which hinders movement and in effect interrupts the driving engagement between the chains 32 and said stacks.

It should be noted that in FIG. 3, the chains 32 are shown spaced from the bottom of the stack 22, which has been done to illustrate the fact that driving engagement has been interrupted. In practice, the chains 32 will be approximately at the same level as the wear strips 42 and will engage the stack, but with insufficient force to establish driving engagement, the chains 32 merely passing beneath the lowermost cases 24 in said stacks.

Figure 5:
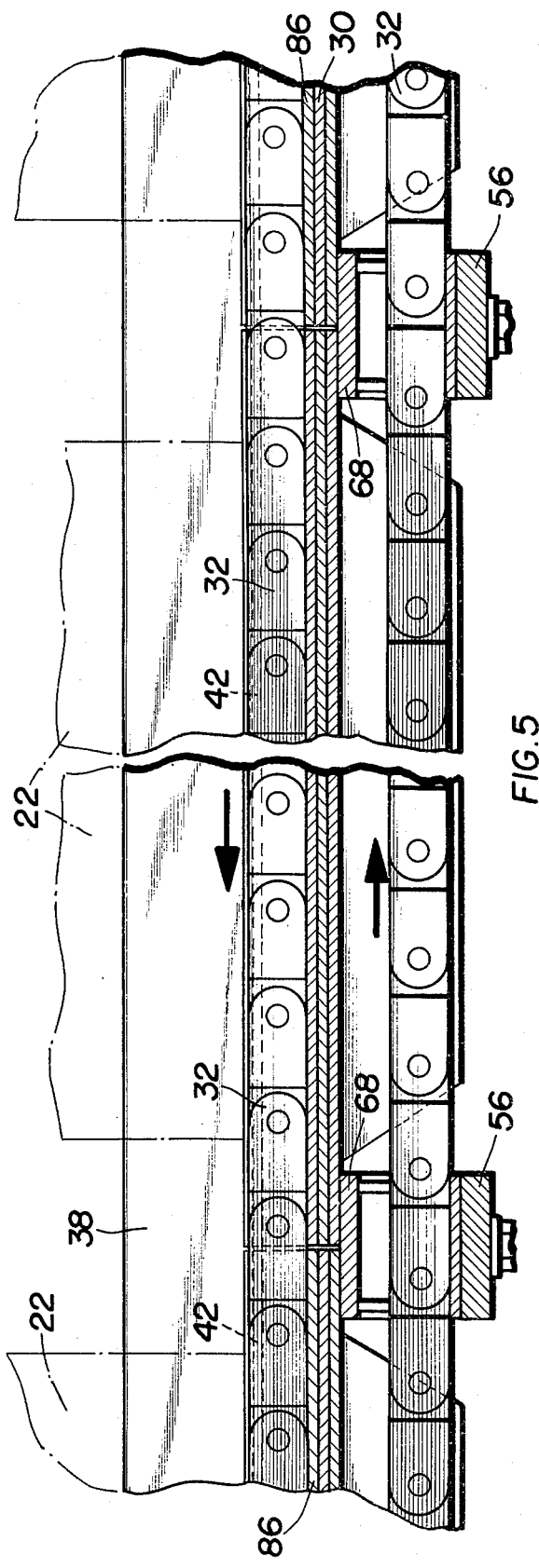
FIG. 5 is a fragmentary sectional view taken along the line 5—5 of FIG. 3.

Looking to FIGS. 4 and 5, these are longitudinal sectional views taken through the middle of the conveyor respectively, and at the drive chain supporting troughs 52, respectiveely, illustrating the conditions wherein the drive chains 32 are not in driving engagement with stacks 32, said stacks resting on the wear strips 42. Considering first FIG. 4, the relative relationship between adjacent drive chain supporting sections 50 can be seen, as can the supply line 64 which provides pressurized air for the air bags 60.

For reference purposes, it will be assumed that the stacks 22 of filled cases are moving in a direction indicated by the arrow 80. Thus, in relation to this direction of movement, each chain support section 50 will have an inlet end 82 and an outlet end 84. In this regard, it should be noted that the outlet end 84' of section 50' rests upon the same plate member 68 as the inlet end 82'' of the chain support section 50''; and correspondingly, the outlet end 84'' of said section 50'' rests upon the same plate member 68 as an inlet end 82''' of section 50'''. Accordingly, the stacks 22 positioned above the adjacent sections 50' and 50'' will produce forces in counter-action to the uplifting forces established by the mounting unit 54 positioned at the juncture of said adjacent chains support sections 50. As such the chain support sections 50 are mounted for inter-action with regard to adjacent support sections. That is to say, the outlet end 82' cannot be depressed until the inlet 84'' of the adjacent section is depressed, which movement is achieved in relation to the weight of stacks on both sections 50' and 50''.

In FIG. 4 the relationship of the supporting sections 50 relative to the drive chains 32 can been seen. In this regard, the chains 32 rest upon the bottom of the troughs 52 which may include wear strips 86. As such, the weight of the stacks 22 resting on the chains 32 at any given time will be transmitted directly to the chain support sections 50, and correspondingly must be counter-acted by the mounting units 54, associated therewith.

Attention is now directed to FIGS. 6 – 8 which, as mentioned previously, are schematic representations showing the conditions existing when driving engagement is interrupted (FIG. 6); immediately subsequent to re-establishment of the driving engagement (FIG. 3) and a short time after re-establishment of driving engagement and immediately prior to subsequent disruption in the conveying process. In addition, and most importantly, FIGS. 6 – 8 illustrate the structural relationships which enable re-establishment of driving engagement once it has been interrupted.

Considering first FIG. 6, it should be noted that only selected elements of the conveyor 20 are illustrated in this schematic representation, with the left hand portion of the figure as viewed representing the discharged end of the conveyor 20. Basically, the conveyor elements as illustrated include the drive chains 32, the drive chain support sections 50 with their respective inlet and outlet ends 82 and 84, and the mounting units 54 positioned in supporting relation to the adjacent ends of the respective support sections 50. In addition, there is shown, also schematically, a stop member 86 which is employed to retard and control the flow of the stacks to the palletizing station, and a sprocket 87 over which the drive chain 32 is engaged. The support surfaces provided by the frame 26, and upon which the stacks 22 may rest, are not specifically illustrated. In this regard, the supporting of stacks 22 and said frame 26 is represented by a slight spacing between the stacks 22 and the drive chains 32.

It should be noted with regard to FIG. 6, that the outlet end $84_1$ of the forwardmost drive chain support section $50_1$ is fixed relative to the frame 26, that is, is not supported by one of the relatively movable pressurized mounting units 54. In this regard, provision is made at 88 for pivotal movement of the support section $50_1$ relative to the frame. Accordingly, it should be noted that with the condition as shown in FIG. 6, with the stop 86 retarding movement, the cases resting on the various drive chain supporting sections 50 will be such as to overcome any uplifting force established by the various mounting units 54. Thus, the various drive chain support sections $50_2$, $50_3$, etc. disposed rearwardly of the support section $50_1$ which defines the discharged end of conveyor 20, will be depressed with the stacks 22 of cases resting upon the supporting surfaces provided by the frame 26. At the forwardmost support section $50_1$, only the inlet end $82_1$ thereof will be depressed, such that the outlet end $84_1$ will be at a level wherein the stacks 22 rest directly upon the drive chain 32, with only the stop 86 retarding movement, said chain 32 slipping relative to the lowermost case in said stacks.

Therefore, upon retraction of the stop 86, the forwardmost stacks 22 resting on the drive chain 32 in the area of the outlet end $84_1$ of section $50_1$ will immediately move past the stop location, for delivery to the palletizing station (not shown). As the stacks 22 move off the support section $50_1$, the combined weight of the stacks applied to the mounting unit $54_1$ is reduced to a level which is insufficient to overcome the uplifting forces provided by said unit. Accordingly, mounting unit $54_1$ will expand to raise the inlet end $82_1$ of section $50_1$ and the outlet end $84_2$ of support section $50_2$, which movement in turn brings the drive chain 32 into engagement with the stacks positioned in the area of said inlet and said outlet ends. This condition is illustrated generally in FIG. 7, where it can be seen that the support section $50_1$ is now generally horizontal and at a level sufficient to bring the drive chains 32 into engagement with any stacks 22 positioned thereon. The next adjacent support section $50_2$ is partially elevated, the outlet end $84_2$ being at the level of the inlet end $82_1$ of support section $50_1$. The rearwardly disposed support sections $50_3$ and $50_4$ remain at levels insufficient to bring the drive chains 32 into engagement with the stacks 22 positioned thereover.

Once movement of the stacks 22 is commenced, there in effect results a chain reaction due to the joint mounting of the ends of adjacent support sections 50 on the mounting units 54. That is to say, as movement continues the rearwardly disposed support sections $50_3$ and $50_4$ will be progressively relieved of the weight of stacks 22 and will elevate in a similar manner to bring the drive chain 32 into engagement with the stacks 22 positioned in the general area thereof. The chain reaction effect referred to, is believed apparent by comparison of the relative positions of the support sections $50_1$, $50_2$ and $50_3$ in FIGS. 6 – 8; and soon results in driving engagement being established along the entire length of the conveyor 20.

Of importance with regard to the preceding discussion, is the fact that driving engagement between the drive chains 32 and the various stacks 22 of filled cases 22 is established progressively. Thus, the stacks 22 will commence movement in a manner which will produce spacing between adjacent stacks 22, as shown in FIG. 8, which it can be appreciated facilitates the subsequent repositioning of the stop 86 to retard movement after the desired number of stacks have passed off the conveyor 20 and on to the palletizing station. In addition, keeping in mind the fact that the chains 32 are being driven continuously, it will be noted that the load placed upon said chains 32 is also applied in a progressive manner which minimizes the shock load applied to said chain and its associated drive mechanism.

Next, attention will be directed to what occurs upon the subsequent introduction of the stop 86 to the conveyor path. When this occurs, the forwardmost stack 22 will engage said stop 86 and will come to rest, with the drive chains 32 slipping relative to said forwardmost stack. The next stack in line will be brought to rest by engagement with the forwardmost stack. This action is repeated with regard to the remaining stacks along the conveyor until shortly support section $50_1$ is filled and the weight of stacks 22 thereon, coupled with the weight of the stacks being conveyed on the adjacent support section $50_2$, is sufficient to overcome the uplifting force provided by the first mounting unit $54_1$. When this occurs, the inlet end $82_1$ of section $50_1$, and the outlet end $84_2$ of support section $50_2$ become depressed and driving egagement between the drive chains 32 and the stacks of cases in this area is interrupted with the stacks 22 resting upon frame 26. Accordingly, stacks of cases will begin to accumulate on section $50_2$ until these are sufficient to depress the mounting unit $54_2$. The occurrences as discussed above are repeated, until the various chain support sections $50_2$, $50_3$, $50_4$, etc. have been depressed so as to interrupt driving engagement along the length of the conveyor 26. As driving engagement is interrupted the stacks 22 will come to rest in spaced groupings, such as shown in FIG. 6. The interval between the respective groups of stacks 22 will occur approximately at the location of the mounting units 54.

Thus, as stacks 22 are required at the palletizing station, they will move off conveyor 20, with the stop 86 being introduced into the conveyor path after the required number of stacks have been discharged. The retarding of movement of the conveyed stacks 22 will then automatically result in interruption in the driving engagement between chains 32 and stacks 22 along the length of the conveyor 20, in the manner described.

When this occurs, the adverse effects of engagement of adjacent stacks is minimized, as the stacks 22 will come to rest in relatively small groupings. Further, the engagement of chains 32 with the stacks 22, such as it may be, will not result in the excessive wear occasioned by the prior art practices discussed above. Also of importance is the fact that once driving engagement between chains 32 and stacks 22 is again established, this is done progressively to provide for spacing between individual stacks, as well as the progressive application of load to the drive mechanism for drive chains 32.

Accordingly, while there has been disclosed and illustrated a preferred embodiment of the conveyor apparatus of the present invention, it should be understood that it is not intended to limit this invention to the disclosed embodiment, or the particular field of use, with which this embodiment has been described. On the contrary, it is realized that those skilled in the art may readily apply this invention to other fields of use, or devise equivalents for, or modifications to the disclosed structure, without departing from the spirit and scope of the present invention, as defined by the claims appended hereto.

The invention is claimed as follows:

1. Conveyor apparatus of the type designed for the controlled application of driving forces to conveyed articles, said conveyor apparatus including: an elongate frame providing surface means adapted to have the conveyed articles supported thereon; drive means for applying the driving force to the conveyed articles to move said articles along the length of said frame; drive means support structure having said drive means supported thereon and being operatively positioned relative to said frame surface means; and mounting means for said support structure adapting said support structure and said drive means for movement relative to said frame, said mounting means including pressure actuated means, such that the relative positions of said drive means support structure is dependent upon the weight of conveyed articles resting thereon, whereby when said weight exceeds a preselected value, said drive means support structure will be lowered to dispose the drive means below said frame surface means interrupting the driving engagement between said drive means and said conveyed articles, however, when said weight of conveyed articles is less than the preselected value said drive means will be supported for driving engagement with the conveyed articles.

2. Conveyor apparatus as defined in claim 1, wherein said frame includes a pair of spaced parallel surfaces, which defines said surface means, with said drive means support structure being disposed interiorly of said frame and intermediate said surfaces.

3. Conveyor apparatus as defined in claim 1, wherein said drive means support structure includes a plurality of aligned, elongate sections, including trough means for accommodating the drive means, and said mounting means for the drive means support structure including a plurality of mounting units, with a mounting unit being located at the juncture of the aligned sections, and simultaneously supporting the adjacent ends of said aligned support sections.

4. Conveyor apparatus as defined in claim 3, wherein said mounting units are pressure actuated, such that the position of said support sections and correspondingly the position of the drive means supported thereon relative to the frame surface means will be determined by the weight of conveyed articles supported thereon.

5. Conveyor apparatus as defined in claim 4, including means for controlling the pressure applied to said mounting units.

6. Conveyor apparatus as defined in claim 4, wherein said mounting units each include an air bag, a plate member supported on said air bag, said plate member having the adjacent ends of the aligned drive means support sections resting thereon, and means for supplying air to said air bag.

7. Conveyor apparatus as defined in claim 6, wherein said plate member includes stop means engageable with abutment means on said frame to limit the upward movement of said plate member relative to said frame.

8. Conveyor apparatus as defined in claim 1, wherein said frame includes a pair of spaced elongate elements providing horizontal spaced support surfaces, which define said surface means, and said drive means support structure being positioned intermediate said spaced support surfaces and including a pair of spaced parallel troughs extending along the length of said frame; said drive means comprising a pair of endless drive chains disposed in said troughs.

9. Conveyor apparatus of the type designed for the controlled application of driving forces to conveyed articles, said conveyor apparatus including: an elongate frame providing surface means adapted to have the conveyed articles supported thereon; drive means for applying the driving force to the conveyed articles to move said articles along the length of said frame; drive means support structure having said drive means supported thereon and being operatively positioned relative to said frame surface means; said drive means support structure including at least two adjacent aligned support sections, whereby one said support section is a forward section and the other a rearward section, with each said support sections having respectively inlet and outlet ends, in relation to the direction of movement of the conveyed articles; and mounting means for said support structure adapting said support structure and said drive means for movement relative to said frame, said mounting means including a first mounting unit positioned at the juncture of the aligned support sections and simultaneously supporting the inlet end of the forward section and the outlet end of the rearward section for movement relative to said frame means, and a second mounting unit for the inlet end of said rearward support section mounting same for movement relative to said frame, while the outlet end of said forward section is fixed relative to said frame to position the drive means above said frame surface means, in the general area of said outlet end of the forward section whereby said drive means may be positioned above said surface means provided by the frame for imparting driving forces to the conveyed articles, or said drive means may be positioned at a level wherein the application of driving forces is interrupted, with said conveyed articles at rest, supported upon said surface means.

10. Conveyor apparatus as defined in claim 9, wherein said mounting units include means applying an upward force to said support sections that is in opposition to the downward forces created by the weight of articles resting on said drive means; wherein the position of said support sections relative to the frame, and correspondingly, the position of said drive means relative to the support surfaces on the frame is dependent upon the weight of conveyed articles being supported on said drive means support sections.

11. Conveyor apparatus as defined in claim 9, wherein said mounting units are pressure actuated, and there is provided means for controlling the application of pressure thereto.

12. Conveyor apparatus as defined in claim 9, wherein said mounting units include expandable air bags.

13. Conveyor apparatus as defined in claim 9, wherein the outlet end of said forward support section defines a discharge end for said conveyor apparatus, and there is provided a plurality of aligned drive means support sections extending rearwardly of said forward support sections, with the adjacent ends of said aligned rearwardly extending sections being supported by mounting units.

14. A mounting arrangement for use with drive means to provide a conveyor apparatus which will produce an interruption in the application of driving force to the conveyed articles, upon the occurrence of overload conditions, while providing for the resumptions in said application of driving forces, said mounting arrangement including; an elongate support frame having article supporting surface means extending therealong; drive means support structure disposed intermediate said article support surface means for accommodating drive means of the type capable of applying a driving force to the conveyed articles; mounting means for said support structure, adapting said support structure and the drive means to be carried thereon for movement relative to said frame, said mounting means including pressure actuated means, such that the relative positions of said drive means support structure is dependent upon the weight of conveyed articles resting thereon, whereby when said weight exceeds a preselected value, said drive means support structure will be lowered to disposed the drive means carried thereon below said frame surface means thereby interrupting the driving engagement between said drive means and said conveyed articles, however, when said weight of conveyed articles is less than the preselected value said drive means will be supported in position for driving engagement with the conveyed articles.

15. A mounting arrangement for use with drive means to provide a conveyor apparatus which will produce an interruption in the application of driving force to the conveyed articles, upon the occurrence of overload conditions, while providing for the resumptions in said application of driving forces, said mounting arrangement including; an elongate support frame having article supporting surface means extending therealong; drive means support structure disposed intermediate said article support surface means for accommodating drive means of the type capable of applying a driving force to the conveyed articles; mounting means for said drive means support structure, adapting said support structure and the drive means to be carried thereon for movement relative to said frame, wherein said support structure means may be disposed below a specified level wherein said conveyed articles will rest on said support surface means, said mounting means permitting elevation of said support structure above said level, wherein said drive means may be brought into driving engagement with said conveyed articles carried thereon below said frame surface means thereby interrupting the driving engagement between said drive means and said conveyed articles, however, when said weight of conveyed articles is less than the preselected value said drive means will be supported in position for driving engagement with the conveyed articles, said mounting means for said drive means support structure, including biasing means for imparting an upwardly directed force to said support structure, which upward force can be overcome by the weight of the conveyed articles resting thereon, such that the position of said drive means support structure, and correspondingly, the position of the drive means supported thereon will vary with the weight of conveyed articles supported.

16. A mounting arrangement for use with drive means to provide a conveyor apparatus which will produce an interruption in the application of driving force to the conveyed articles, upon the occurrence of overload conditions, while providing for the resumptions in said application of driving forces, said mounting arrangement including; an elongate support frame having article supporting surface means extending therealong; drive means support structure disposed intermediate said article support surface means for accommodating drive means of the type capable of applying a driving force to the conveyed articles; mounting means for said drive means support structure, adapting said support structure and the drive means to be carried thereon for movement relative to said frame, wherein said support structure means may be disposed below a specified level wherein said conveyed articles will rest on said support surface means, said mounting means permitting elevation of said support structure above said level, wherein said drive means may be brought into driving engagement with said conveyed articles carried thereon below said frame surface means thereby interrupting the driving engagement between said drive means and said conveyed articles, however, when said weight of conveyed articles is less than the preselected value said drive means will be supported in position for driving engagement with the conveyed articles, and said drive means support structure including a plurality of aligned support sections, and said mounting means including a plurality of mounting units, one said unit supporting the adjacent ends of each said aligned sections.

17. A mounting arrangement as defined in claim 16, wherein said mounting units include biasing means for applying an upwardly directed force to ends of said support sections, in opposition to the weight of conveyed articles supported by adjacent support sections, such that when said weight exceeds a predetermined value, the ends of said support sections will be disposed below said specified level with the conveyed articles resting on said support surface means of the frame thereby effecting interruption in said driving engagement.

18. A mounting arrangement as defined in claim 17, wherein said biasing means for said mounting units include an inflatable air bag, and there is provided means for applying air under controlled pressure to said air bags.

19. Conveyor apparatus providing for the interruption and subsequent resumption of the application of driving forces to the articles conveyed thereon, in response to the weight of conveyed articles resting upon said conveyor apparatus, said apparatus including; drive means adapted to be engaged with the conveyed articles for applying a driving force thereto; an elongate frame including article support means extending along the length thereof; drive means support structure having said drive means supported thereon for engagement with the conveyed articles, said drive means support structure including at least two aligned, adjacent sections whereby one said section is a forward section and the other a rearward section, with each said section having inlet and outlet ends, respectively, in relation to the direction of movement of conveyed articles; relatively movable mounting means for said adjacent sections, including a first mounting unit positioned at the junction of said rearward and forward sections, and simultaneously supporting the outlet end of said rearward section and the inlet end of said forward section, and a second mounting unit supporting the inlet end of said rearward section, said mounting units being responsive to the weight of conveyed articles on the associated section which determines the relative position thereof, whereby when said support sections are above a specified level, said drive means will be brought into driving engagement with said conveyed articles, while said driving engagement will be interrupted when said sections are disposed below said specified level, with said conveyed articles resting upon the support means provided by said frame.

* * * * *